June 23, 1942. W. M. BISHOP 2,287,163
SEAL AND JOINT FOR DEEP-SEA CABLES
Filed April 13, 1939 4 Sheets-Sheet 1
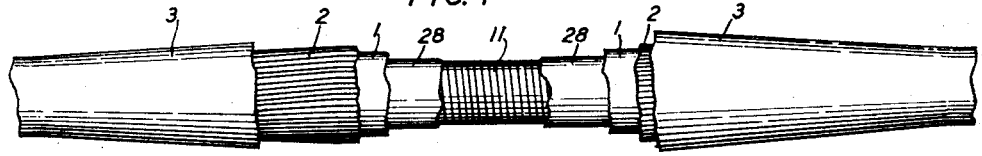
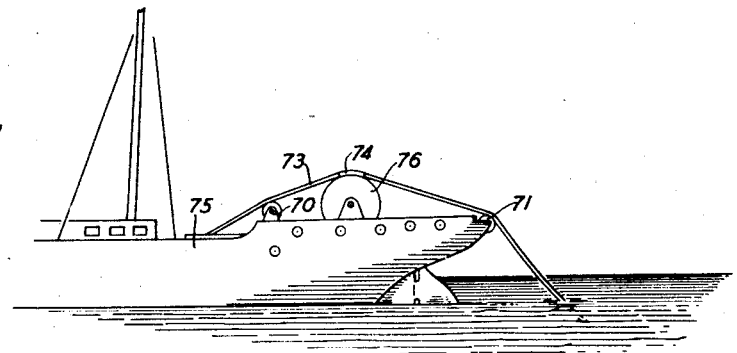
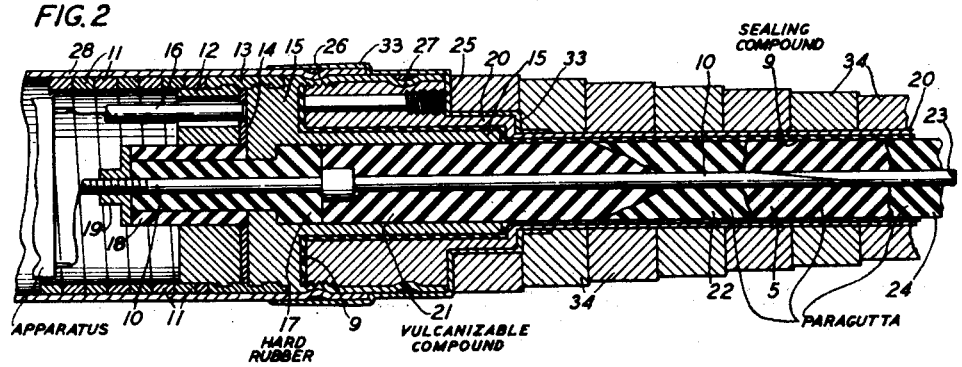
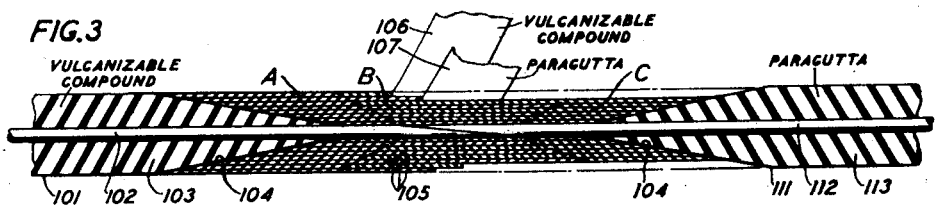
INVENTOR
W. M. BISHOP
BY
ATTORNEY

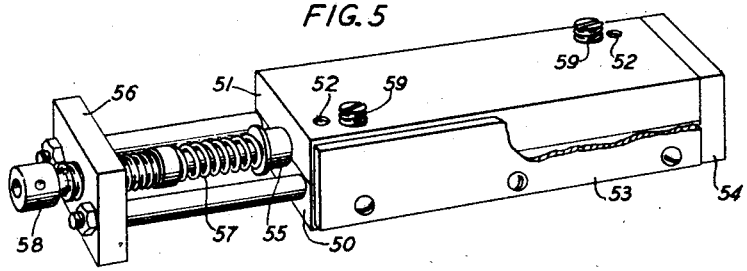
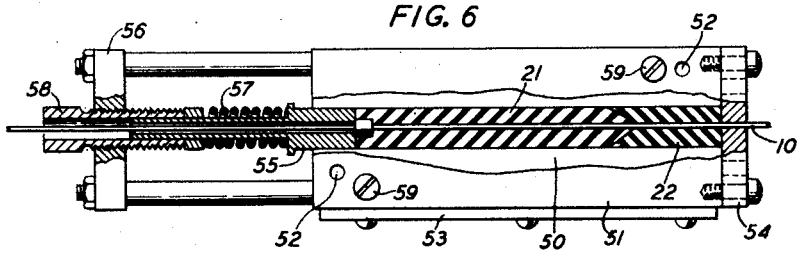
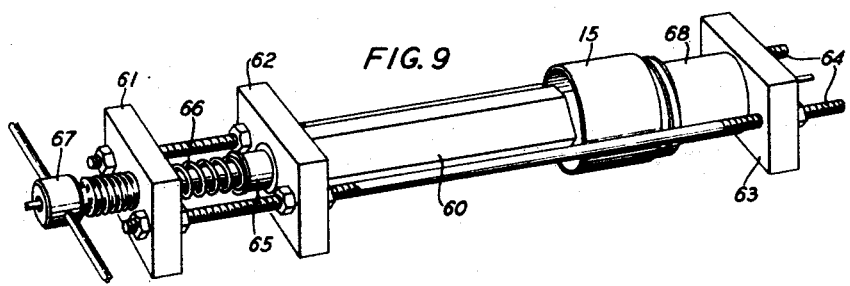
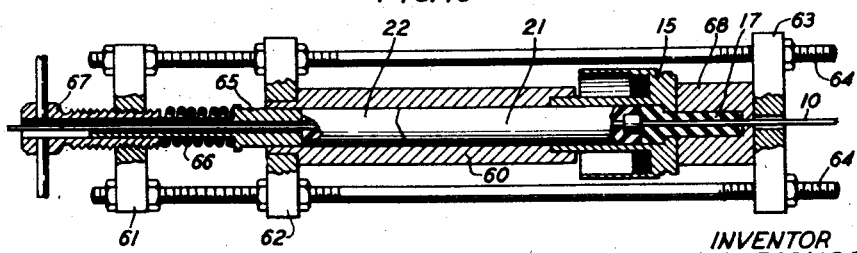

June 23, 1942.   W. M. BISHOP   2,287,163
SEAL AND JOINT FOR DEEP-SEA CABLES
Filed April 13, 1939   4 Sheets-Sheet 3
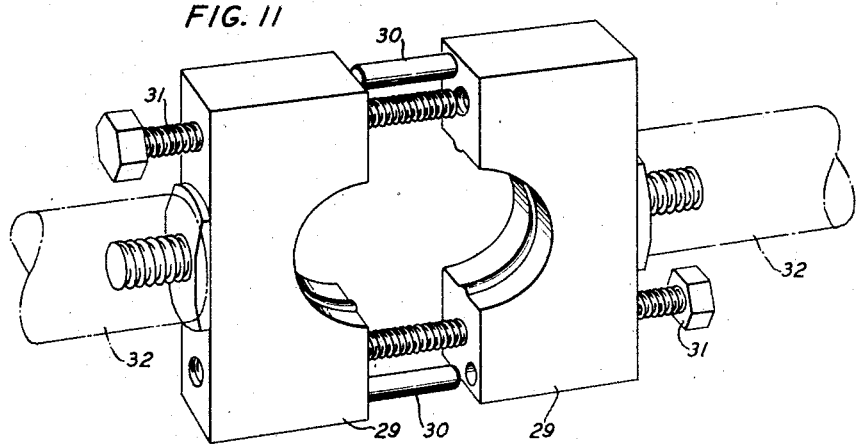
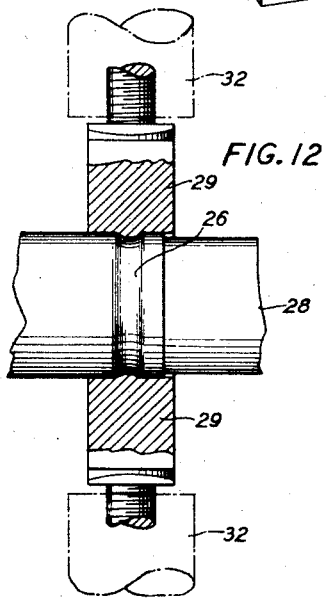
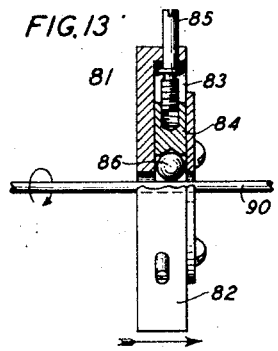
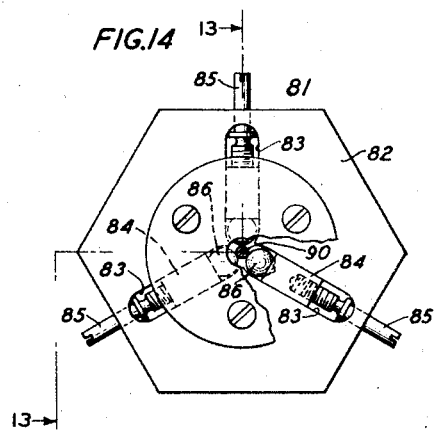
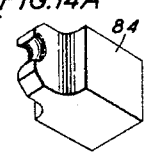
INVENTOR
W. M. BISHOP
BY
*O. E. Rasmussen*
ATTORNEY June 23, 1942.  W. M. BISHOP  2,287,163
SEAL AND JOINT FOR DEEP-SEA CABLES
Filed April 13, 1939  4 Sheets-Sheet 4
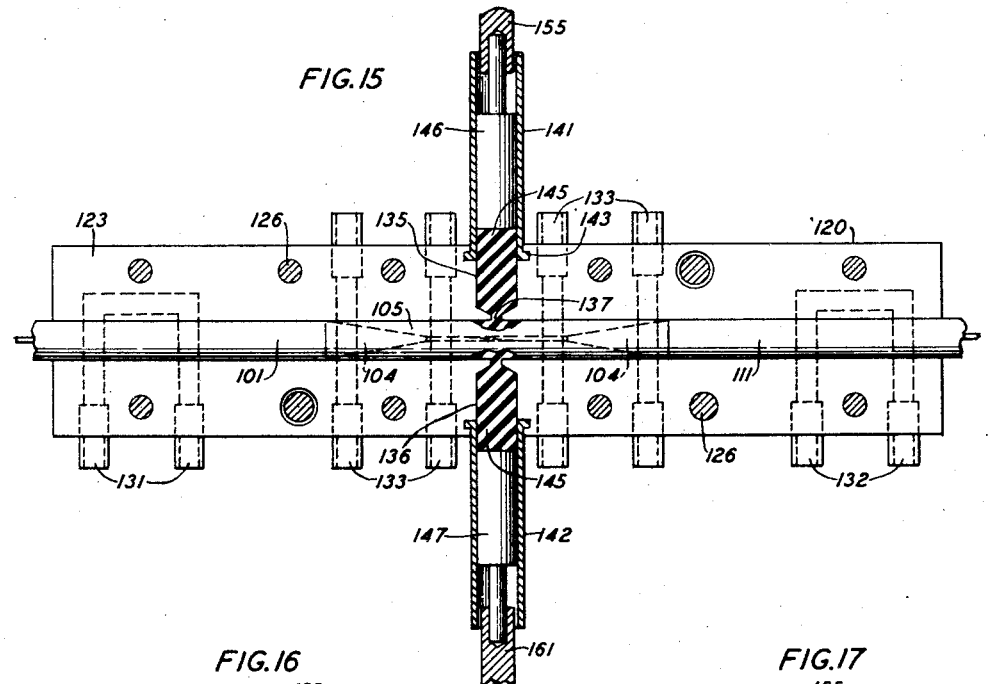
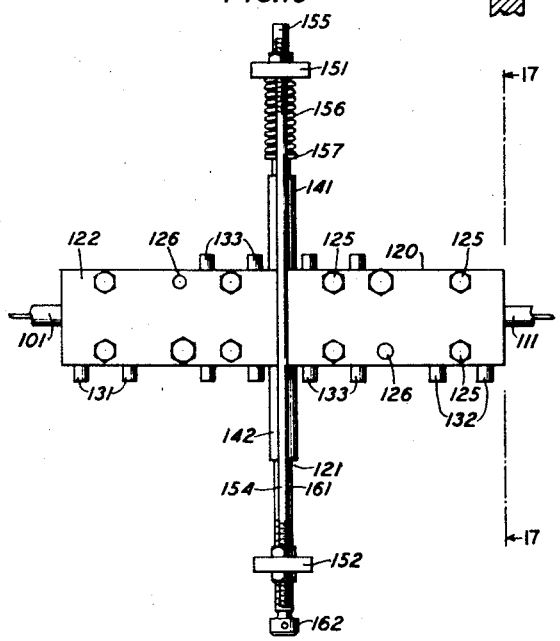
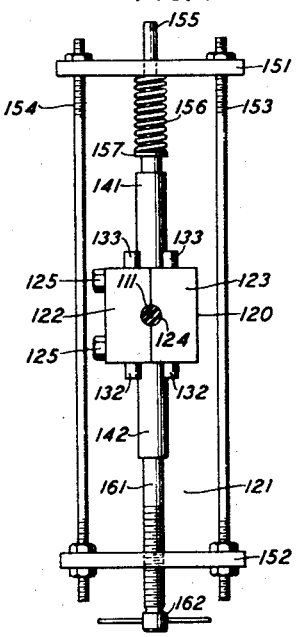
INVENTOR
W. M. BISHOP
BY
ATTORNEY Patented June 23, 1942

2,287,163

UNITED STATES PATENT OFFICE 2,287,163

SEAL AND JOINT FOR DEEP-SEA CABLES

Walter M. Bishop, Flushing, N. Y., assignor to Bell Telephone Laboratories, Incorporated, New York, N. Y., a corporation of New York Application April 13, 1939, Serial No. 267,632

16 Claims. (Cl. 173—244)

The invention relates to deep-sea cable systems and more particularly to methods of and means for making seals and joints for deep-sea cables.

An object of the invention is to produce insulating seals or joints for cables of this type, which will withstand high water pressures, which will form substantially perfect bonds with the cable insulation, and which will be practically as impervious to water as the insulation of the cable.

A more specific object of the invention is to produce a joint between two deep-sea cable sections having the qualities enumerated above, but being especially adapted for joining two cable sections having characteristically different insulations, and particularly where one cable is insulated with rubber insulation and the other with an unvulcanizable compound, such as the several types of gutta-percha insulations or compounds.

Another more specific object of the invention is to produce an insulating end-seal for a deep-sea cable adapted to terminate in and connect to a hollow housing containing apparatus and suitable for laying with the cable on the sea bottom, the seal in this case being formed between metal parts of the container and of the cable to form substantially perfect bonds therewith.

It is, however, a principal object of the invention to provide a method, and the necessary means therefor, of making seals or joints for elongated strands, such as deep-sea cables, which will require much less skill on the part of the workers than the methods hitherto in use, and which thus will be simpler and less costly than the prior methods, and which at the same time will give greater assurance of uniformly perfect results.

It is therefore a more specific object to provide a method, and the necessary means therefor, of molding insulating compounds in situ to permanently seal a cable end or joint against ingress of sea water at low or high sea pressures.

In accordance with a feature of the invention, the portion of the elongated conducting strand to be sealed is clamped in a closed mold together with the sealing or bonding compound in situ. Heat is then applied to the mold and its contents to plasticize the compound while a high liquid pressure may be applied to the enclosed compound to prevent formation of blow-holes at any place within the mold. During the subsequent cooling, pressure is applied to the enclosed compound until the compound has become substantially solid to prevent formation of shrinkage bubbles. The high pressure also serves to keep the sealing compound in intimate contact with the surfaces to be sealed.

In the case where a vulcanizable material is used for the sealing compound, the step of heating the mold and its contents may be made so that the compound will also become vulcanized and will be vulcanized to the sealing surfaces. In special cases it is desirable to perform the molding operation in one mold and the vulcanizing operation in another mold or at least as a separate subsequent step. In all cases, however, the high fluid pressure is applied to the sealing compound during the cooling process until the compound has fairly completely set.

In accordance with the invention, the liquid pressure is applied while the molds are tightly closed, so that only a very small amount of compound or cable insulation can leak out. The pressure is preferably applied through one or more pistons acting upon the plastic compounds or insulating materials enclosed by the mold. The pistons are forced into engagement with the plastics by any desirable means, and particularly during the cooling period the pistons are forced to follow up the shrinking plastics under high pressure, thereby securing continuous intimate contact between the various sealing surfaces and preventing formation of shrinkage bubbles or of blow-holes due to generation of gas.

In the case of a cable splice the cable ends are prepared by joining the conductors and filling in the space between the cable insulations with a suitable thermoplastic sealing compound, building the joint up to the outside diameter of the cable insulation. A split mold is then clamped tightly about the joint and heat is applied. One or more passages lead from the inside of the mold to a small pump-like device through which a plastic or fluid compound may be forced into the mold cavity during the heating and cooling processes.

In the specific case of a cable, terminated in an apparatus housing adapted for laying on the sea bottom, it is preferable to provide a shop-made gland for insertion in the housing and for subsequent splicing to the cable end. The gland is made up of a bare central conducting rod or tube centered within a concentric metal insert by means of a hard insulating bushing, these parts having suitable shoulder portions in mutual engagement to withstand high sea pressure.

The space between these inner and outer conducting members is then filled with a thermoplastic sealing compound caused to adhere to the two opposite concentric surfaces. For this purpose the sealing compound is first molded about an intermediate portion of the central conductor to the size of the outer conductor in a split mold which is gradually closed during the heating period and into one end of which a piston is fitted having a central bore through which one free end of the central conductor passes. The other free end of the conductor passes through a hole formed in the other end of the mold. During the cooling, the piston is forced in against the plastic compound in the axial direction of the conductor, thereby continuously compressing the compound between all surfaces within the mold.

Thereafter the outer conducting element and the hard insulating bushing are placed in position on the molded unit and this assemblage is placed in another tightly closed split mold, having a similar arrangement of piston fitting into one end of the mold cavity and having bores for passing the free ends of the central conductor. By these means a high axially directed pressure may be applied to the plastic sealing compound during the subsequent heating period thereby forcing the compound into intimate contact with the surface of the central conductor and with the inner surface of the outer conductor; and during the subsequent cooling process the piston can be adjusted to follow up the shrinking compound and maintain or increase the high pressure.

It sometimes is desirable to further strengthen the seal against water leakage and pressure by vulcanizing the sealing compound to the surfaces to be sealed. This is particularly of advantage in the case of the shop-made gland referred to above. For this purpose the two concentric conducting members are made of brass and the sealing compound is suitably prepared for vulcanization. As is well known, various rubber compounds are well suited for vulcanization to brass surfaces. It has, however, been found to be very difficult to secure a sufficiently perfect bond between the brass and the rubber to provide a seal sufficiently strong for the purposes of this invention.

It is, of course, essential that the surfaces of both metal and compound to smooth and clean and be kept free from contamination until the molding operation takes place. However, in accordance with a specific feature of the invention the brass surface is treated immediately before the molding and vulcanizing operations by rubbing or rolling contact under high pressure with polished, rounded surfaces of hardened steel bodies, such as rollers, balls, or dies. It appears that the pressure of the steel bodies moving relative to the brass surface must be sufficiently high to cause a metallic flow in the brass surface, that is, to cause burnishing of the brass surface, whereby a high degree of smoothness is attained. Whatever may be the action of this treatment, exceptionally perfect vulcanized bonds between such burnished brass surfaces and rubber have readily been secured in this manner.

It is an important feature of the invention that the heated mold or portion thereof containing a compound in a more or less fluid or plasticized condition should be cooled from a point remote from the point on the mold at which the follow-up pressure is applied, in order that, as the cooling proceeds in one direction, fluid compound may be supplied in a direction toward the shrinking compound at all stages of the cooling period to prevent formation of any voids, and to insure that the shrinking compound is kept in close contact with its contiguous surfaces until it has reached a solid state at which no further shrinkage will occur. Thus supplemental compound may be supplied or shifted lengthwise of the mold to keep the cooler part of the mold filled and thus insure that the radial dimensions of the seal will not be reduced.

The various features of the invention will now be described as applied to specific preferred embodiments of characteristically different types and reference will be made to the accompanying drawings, in which:

Fig. 1 is a general view of a housing inserted between two cable sections, parts being broken away to show details of the protecting structure;

Fig. 2 is a sectional view of an end-seal for joining a cable end to the housing, it includes a gland sealed into the housing with a plastic compound constructed in accordance with the invention and it includes a joint between the gland and the cable terminal which may also be constructed in accordance with the invention;

Fig. 3 is a detail view of a joining seal, prepared in accordance with the invention, between two spliced cable sections, one of which is insulated with a vulcanizable compound and the other with a non-vulcanizable compound;

Fig. 4 shows the laying of a housing inserted between two cable sections and sealed thereto in accordance with the invention;

Figs. 5, 6, 9 and 10 are views of molds employed in the preparation of the seal for the housing shown in Fig. 2;

Figs. 7 and 8 show parts of the end-seal shown in Fig. 2;

Figs. 11 and 12 are views of a tool employed in the construction of the end-seal shown in Fig. 2;

Figs. 13, 14 and 14a show a die and a modification thereof for preparing the surface of a brass conductor for vulcanization thereto of a vulcanizable compound; and Figs. 15, 16 and 17 are views of a molding structure employed in the preparation of the joining seal between two spliced cable sections. Fig. 15 is a detail view showing the mold proper with one-half removed, and with a cable splice in position for curing. Figs. 16 and 17 are front and end elevations of the entire structure.

Fig. 1 shows a housing, with parts broken away, sealed to the attached cable sections in accordance with this invention. The housing comprises a helix 11 of steel or other material which is capable of withstanding deep-sea pressures. A pliable copper jacket 28 covers the helix 11. The jacket 28 may be constructed of other material which is pliable and which will remain impervious to water. A layer of jute 1 is wound around the copper jacket 28. Over the jute, the armor wire 2 of the submarine cables is placed. Another layer of jute 3 is wound around the armor wire 2.

Fig. 2 shows details of an end-seal for the housing shown in Fig. 1. The end-seal or gland, shown in Fig. 2, is fitted into the elongated steel helix 11 which is capable of withstanding deep-sea pressures. A steel end-plate 12 supports each end of the helix radially and resists the end thrust due to the undersea pressure. The helix supports the steel end-plate 12 longitudinally by means of an internally threaded collar 13 which is fixedly held to the plate 12 by means of the threads thereof. A copper ground plate 14, held in contact with an outer brass conductor or connecting piece 15 by means of the internally threaded collar 13, has a terminal 16 fixedly attached thereto which passes through the end-plate 12. The ground plate 14 is preferably soldered to the outer conductor 15. A central conductor 10 having a shoulder passes through the outer conductor 15, the ground plate 14 and the end-plate 12. The central conductor 10 may be either solid or hollow. The central conductor 10 is insulated from the outer conductor 15, the ground plate 14 and the end-plate 12 by means of a hard rubber insulator 17 having a shoulder. The shoulder of the conductor 10 rests against the insulator 17, while the shoulder of the insulator 17 rests against the outer conductor 15. The radial width of the shoulders of the insulator 17 and the conductor 10 must be sufficient to prevent appreciable extrusion of the insulator 17 through the outer conductor 15 and of the conductor 10 through the insulator 15, respectively, when these are subjected to sea bottom pressures. The axial length of the shoulders of both the insulator 17 and the conductor 10 must be sufficiently great for the shoulders to withstand deep-sea pressures without shearing. This construction and arrangement of the conductor 10 and the insulator 17 results in preventing leakage of water between the outer conductor 15 and the insulator 17. A nut 19, held rigidly by means of threads on the end of the conductor 10, holds the conductor 10 and insulator 17 to the outer conductor 15, with the aid of an insulator collar 18 which rests against the outer conductor 15. The central conductor 10 is separated from the outer conductor 15 by means of a vulcanizable compound 21 vulcanized to both conductors. The manner of vulcanizing the compound and its composition are described hereinafter in the consideration of Figs. 5 to 10.

Before vulcanization of the compound 21, "Paragutta" or other suitable insulating material 22 is joined to the vulcanizing compound 21 at a point beyond the end of the outer conductor 15. Before laying the cable and housing, the central conductor 10 is joined to a central conductor 23 of a submarine cable. "Paragutta" insulation 24 of the submarine cable is joined to the "Paragutta" insulation 22, surrounding the central conductor 10, by "Paragutta" insulation 5. After the joining operation, a sleeve or end-piece 20, having a long tube which surrounds the insulation of the central conductor 10 and a portion of the insulation 24 of the submarine cable, is inserted by means of threads into the outer conductor 15. The sleeve 20 is provided with a plug 25 for forcing a sealing compound 9 between the sleeve and insulation. The sealing compound 9, such as melted rubber or a viscous petroleum oil which is fluid at low temperature, is forced between the outer conductor 15 and the sleeve 20, between the insulations 21 and 22 covering the central conductor 10 and the sleeve 20, in addition to filling the space between the sleeve 20 and the insulations 24 and 5 covering the conductor 23 of the submarine cable which are surrounded by the sleeve 20. The outer conductor 15 and the sleeve 20 each have a groove 26 and 27, respectively, in their outer surfaces. The jacket 28, comprising copper or other material which is pliable and impervious to water, completely covers the steel helix 11. In addition, the jacket 28 covers the collar 13, which is brazed to the jacket 28, and extends over the outer conductor 15 beyond the point where the groove 26 of the outer conductor is located. Before the outer conductor is inserted in the jacket 28, the inside of the jacket 28 is tinned on the portion which covers the outer conductor. After the end-plate 12, the ground plate 14 and outer conductor 15 have been inserted into the jacket 28, the end of the jacket is temporarily covered with a rubber sleeve to prevent entrance of water into the housing and the assembly is subjected to hydrostatic pressure. As a result of this procedure the jacket 28 is crimped into the groove 26 of the outer conductor.

The jacket 28 is soldered to the outer conductor 15 at the point of the crimp 26 in the soldering tool shown in Figs. 11 and 12. The tool consists of two blocks 29 which, when closed with the aid of guides 30 and tightening screws 31, have the contour which has been given to the jacket 28 at the point of the groove 26 of the outer conductor 15. The housing with jacket 28 is inserted in the tool and the screws 31 tightened to exert the desired pressure. Heat is applied to the plates 29 by means of two heated metallic cylindrical blocks 32. Preferably, the plates 29 are heated before insertion of the jacket 28 in order that the operation may be performed quickly, thereby preventing any deleterious effect on the rubber insulation.

After the jacket 28 has been soldered to the outer conductor or connecting piece 15, the outer conductor 15 is crimped into the groove 27 in sleeve 20 by temporarily covering the assemblage with a rubber tube and subjecting it to hydrostatic pressure. The outer conductor 15 and the sleeve are then soldered in a tool similar to that shown in Figs. 11 and 12 and in a manner identical with the soldering of the jacket to the outer conductor. The crimping of the jacket to the outer conductor and the crimping of the outer conductor to the sleeve insures the formation of a metallic seal between the respective parts by means of the solder completely around the sleeve, outer conductor and jacket. As a further aid in preventing damage to the rubber part of the housing, a soft solder having a low melting point is preferably employed in the soldering operation. To prevent corrosion at the point of jointure of the jacket and sleeve with the outer conductor, the sleeve is made of the same metal as the jacket and the end portion of the jacket, the exposed portion of the outer conductor and the adjacent portion of the sleeve are electroplated with the same metal as that of the jacket and sleeve. The electroplating is represented in the drawing by the numeral 33. In addition to preventing corrosion, the electroplating 33 insures against leakage of water through the soldered joints. After electroplating, a plurality of rings 34 are employed to produce a taper between the housing and the submarine cable. These rings are of gradually reduced diameter from that of the end of the housing to that of the submarine cable and are supported by the sleeve 20. One lead of the electrical apparatus, represented as a labeled block diagram in the drawing and contained within the housing, is connected to the terminal 16 and the other lead is connected to the central conductor 10.

In Fig. 4, the laying of a submarine cable and the housing is shown. In the laying of a cable for undersea communication, the cable usually passes over two sheaves and a drum. A cable 13 having a housing 14, constructed in accordance with this invention and connected into the cable, passes over two sheaves 70 and 71 and a drum 76 located on a cable ship 75. The flexible nature of the housing permits the laying of the cable without the necessity of splicing of the cable on the cable ship for the connection of the housing.

Figs. 5 and 6 show the mold for forming about the central conductor 10 the composite seal, comprising the compounds 21 and 22, one section of which is subsequently vulcanized to the conductor 10 and outer conductor 15. The mold consists of two halves or dies 50 and 51 which are aligned with each other by means of two guide pins 52. A steel plate 53 is fixedly attached to the lower half of the mold 50 to prevent loss of the insulating compound. Another steel plate 54 having an aperture therein, through which the conductor 10 passes, is fixedly attached to the lower half of the mold 50. A steel plunger 55 is inserted to engage the shoulder of the conductor 10. Pressure may be applied to the plunger 55 by means of a spring 57. The pressure is produced by the turning of a sleeve 58 which is concentric with the plunger 55 and threaded in a yoke 56. After molding, the two halves of the mold 50 and 51 are separated by means of two screws 59 threaded through the upper half 51 of the mold.

The conductor 10 shown in Fig. 7 is inserted in the mold shown in Figs. 5 and 6 with the shoulder portion of the conductor resting against the plunger 55.

A composition of the vulcanizing compound 21 which has been found satisfactory to produce one section of the seal is as follows:

| | Parts |
|---|---|
| Deresinated balata | 40 |
| Deprotenized rubber | 50 |
| Superla wax | 10 |
| Age rite resin (aldol-alpha-naphthylamine) | 1 |
| Zinc oxide | 50 |
| Captax (mercapto-benzo-theozole) | .5 |
| Stearic acid | .5 |
| Sulphur | 3 |
| Petrolatum | 5 |

The material known commercially as Superla wax, employed as an ingredient in the vulcanizing compound 21 and in the "Paragutta" 22, is a solid paraffin hydrocarbon wax derived from petroleum and having a melting point between 71 and 77° C. A range of materials having somewhat higher and somewhat lower melting points are also satisfactory. Reference is made to United States patent to Wendt and Banta 1,735,555, granted on November 12, 1929, for a further description of such waxes and their modes of preparation.

The compound 21 is placed in the mold between the conductor 10 and the plate 50 for a distance from the shoulder of conductor 10 which is slightly greater than the length of the outer conductor 15. At the other end of the mold, "Paragutta" 22 is inserted which comprises:

| | Parts |
|---|---|
| Deresinated balata | 40 |
| Deproteinized rubber | 50 |
| Superla wax | 10 |

Preferably, the compound 21 and "Paragutta" 22, before being placed in the mold, are cleaned with a cloth saturated with benzol to remove any discoloration which may have accumulated upon the compounds. The upper half of the mold 51 is placed against the compounds and the mold is inserted in a press, which previously has been heated to approximately 100° C., to exert a slight positive pressure. A slight pressure is maintained by frequent readjustment of the press during a ten-minute heating period for the mold, compound and "Paragutta." At the end of ten minutes the mold is gradually closed and should be closed till the end of an additional five-minute period. During this latter period at the first appearance of the compound on the side of the mold opposite the plate 53, the molding is temporarily terminated while the plate 53 is removed. This procedure permits the compound to flow in either direction as the mold is finally closed, thus reducing disturbance of the compound around the central conductor 10.

As soon as the mold 50, 51 is closed, steam employed to heat the press is turned off and cold water passed through the press to cool the mold. During the process of cooling, the pressure in the mold is gradually increased by compressing the spring 57.

After the mold has cooled, the premolded but unvulcanized specimen, as shown in Fig. 8, is withdrawn. It is subsequently vulcanized to the inner conductor 10 and outer conductor 15 in the mold shown in Figs. 9 and 10.

The device for vulcanization shown in Figs. 9 and 10 comprises a hexagonal steel mold 60 the inside of which has a configuration similar to that of the end of the premolded specimen shown in Fig. 8. The mold 60 is adapted to fit on to the outer conductor 15. The outer conductor 15 and steel mold 60 are secured to each other by a clamp comprising two steel plates 62 and 63 held by two rods 64. The two rods 64 also support another plate 61. A plunger 65 is inserted in the interior of the mold 60 and causes pressure to be exerted on the compound seal during vulcanization. Pressure is produced on the plunger 65 by means of a spring 66 and a threaded sleeve 67. The sleeve 67 is threaded in the plate 61 and is concentric with the plunger 65. By turning the sleeve 67 pressure is applied to the plunger. A steel mold 68 is adapted to hold the end of the rubber insulator 17 of the housing which protrudes beyond the outer conductor 15.

The hard rubber insulator 17 is inserted in the outer conductor and the premolded specimen shown in Fig. 8 is inserted in the mold 60. The mold 60, the outer conductor 15 having the hard rubber bushing 17 inserted therein, and the mold 68 are clamped together by means of the plates 62 and 63. Pressure is applied to the plunger by the rotation of the sleeve 67 until a pressure of between 1500 and 3000 pounds per square inch is exerted on the seal sections 21 and 22. The device shown in Figs. 9 and 10 is then placed in an autoclave and the compound 21 cured for a period of thirty minutes at a temperature of approximately 142° C. (steam pressure of approximately 40 pounds per square inch). After curing, the device and seal are permitted to cool, pressure by means of the plunger being exerted during the cooling operation. After cooling, the seal, outer conductor 15 and insulator 17 are removed from the mold. Compound 21 has now been vulcanized to the central conductor 10 and the outer conductor 15.

The outer conductor 15 and the central conductor 10 are cleaned before insertion in the molds shown in Figs. 5, 6, 9 and 10. The internal diameter of the bore through the outer conductor is made slightly undersize and is brought to size by forcing a steel ball having the desired diameter through the bore into the inside of the outer conductor. This procedure results in an extremely smooth inner surface of the outer conductor. A similarly smooth surface is effected on the central conductor by rotating it while passing it through a plurality of steel balls or rollers under pressure.

As an example of this treatment of the brass surface of a conductor for the purpose of vulcanization thereto of a rubber-sulphur compound, a typical arrangement is shown in Figs. 13 and 14. The die 81 includes a general mounting structure 82 with three grooves 83 each adapted to guide a slide 84 in a radial direction with respect to the center of the die. Each slide 84 may be forced toward the center by means of the threaded end of a rod 85 which can be turned by a screw-driver. Each slide 84 has a cup-shaped end engaging a ball 86, also placed in the groove 83. As a practical modification, each of the slides 84 may be of hardened steel and have its inner end shaped and polished to conform with the surface of the conductor as shown in Fig. 14a; in this case the ball 86 will be omitted.

The die is placed about the brass conductor 90 and the rods 85 are tightened up to place the balls 86 in close contact with the conductor. This assemblage may then be placed in a lathe to effect a relative rotary movement between the conductor 90 and the balls 86, and simultaneously therewith a relative longitudinal movement between these parts. Thus, the conductor may be held stationary in the lathe while the die mounted in a chuck is rotated about the conductor, the chuck at the same time being moved longitudinally of the conductor by a finely threaded spindle. By this arrangement of moving parts, all points of the surface of the conductor will be placed in frictional contact with the balls of the die.

The pressure on the balls against the conductor should be high enough to burnish the surface of the conductor, i. e., to cause a cold flow of the brass in the surface of the conductor, thereby producing an extremely smooth virgin surface. The balls should be of hardened, highly polished steel. Care should be taken that the surface of the conductor is clean and is not contaminated during the process or before it is protected by the application of the vulcanizable compound which, of course, also should be cleaned at the time of its application to the burnished brass surface to prevent contamination thereof.

It has been found that a high degree of adherence between the surface of a brass conductor and the vulcanizable compound may be secured by burnishing the brass surface of the conductor and molding and vulcanizing the cleaned rubber compound directly upon the burnished surface before contamination of any of the surfaces can set in. Bonds may be produced between brass and rubber in this manner which are substantially free from unbonded spots and are capable of withstanding a pull of 400 pounds per square inch, the pull being perpendicular to the bonded surface.

Referring now to Fig. 3 which shows details of a seal between two cable sections, the cable end 101 has a central conductor 102 insulated with a vulcanizable compound 103, and the cable end 111 has a central conductor 112 insulated with a non-vulcanizable compound 113. The compound 103 may contain rubber as one of its principal ingredients and includes vulcanizing agents and accelerators; it may be similar to the compound 21, described above. The compound 113 may contain gutta-percha as one of its principal ingredients or it may be similar to the "Paragutta" compound 22, described above.

The ends of the cable cores are prepared for the splice by removing the insulation from a short end of the central conductor and shaving the insulation to the shape of a cone, as shown at 104, taking care to avoid contamination of any sort of the shaved surfaces. The conductors 102 and 112 are then joined, as by soldering. The space between the cone surfaces 104 is then filled to the diameter of the core insulation by wrapping of successive layers of thin strips of insulation which have been softened in hot water. The strips are stretched nearly to the breaking point during the wrapping process and are applied to form uniform layers 105 each of substantially constant diameter throughout its length. For a splice of this type, it is preferable to use alternate layers of vulcanizable tape 106 of a composition similar to insulation 103 and non-vulcanizable tape 107 similar to insulation 113; however, the layers of vulcanizable tape 106 are stopped short some distance from the "Paragutta" insulation 113 and the layers of tape 107 are stopped short some distance from the vulcanizable insulation 103 in such a manner that three zones are formed within the filling between the cone surfaces 104, namely, the zone A containing only vulcanizable compound, the zone C containing only non-vulcanizable compound and the zone B containing alternate layers of both sealing compounds. If desired, the seal may be built up entirely of layers of vulcanizable tape.

When the splice has been completed the joint is placed in a suitable mold, such as shown in Figs. 15, 16 and 17, for the purpose of forming the insulating layers into a homogeneous filling between the cones 104 and to seal this homogeneous compound to the conductor and the cone surfaces 104 by vulcanization, so that a seal will be obtained which is substantially as water-tight as the cable insulating compounds.

The molding structure, shown in Figs. 15, 16 and 17, comprises a split steel mold 120 and a pressure structure 121 for supplying supplemental compound under a follow-up pressure to the seal within the mold. The mold 120 is made up of two substantially identical halves 122 and 123, each having a groove 124 for receiving the splice and short portions of the cable ends 101 and 111. After the two halves of the mold have been placed about the splice they are closed tight about the splice by means of bolts 125, guide pins and holes 126 serve to properly align the two halves.

Each half of the mold 120 has channels in the main body thereof for passing cooling and heating media. Thus, the channels 131 and 132 in each half may be connected to a system for supplying cold circulating water to the mold to keep the cable ends cool during the molding and curing operations. Channels such as 133 in the central portion of each half of the mold may be connected to a system for supplying steam at desired temperatures for molding or for curing of the sealing compound.

The structure 121 for applying pressure to the interior of the mold is assembled after the mold has been closed, with the exception that two cylinders 141 and 142, each having at one end thereof a flared portion 143, are placed in corresponding cavities in the two halves of the mold before the mold is bolted tight. In this manner, the cylinders 141 and 142 are securely locked in position on the mold. The bore of the cylinders 141 and 142 coincide with bores 135 and 136 in the mold formed by the said cavities and each leading through a reduced opening 137 to the sealing compound of the splice.

A supply of supplemental sealing compound 145 is then inserted in each of the cylinders 141 and 142 and is followed by plungers 146 and 147 fitting with a sliding fit into the cylinders 141 and 142, respectively. The supplemental compound may be inserted in the form of a solid cartridge or in any other desirable manner, the compound may be the same as the insulation on either cable end or may conform more closely to the sealing compound used in the splice. This compound must, however, be non-vulcanizable in order to remain fairly plastic until the splice has been cooled.

The pressure structure 121 further comprises a frame of two yokes 151 and 152 with connecting bolts 153 and 154. The yoke 151 serves as a guide for a pressure rod 155 acting on the plunger 146; a spring 156, surrounding the rod 155 and located between the yoke 151 and a shoulder 157 on rod 155, serves to apply pressure to the plunger 146. A pressure rod 161 is threaded through the yoke 152 and is at its free end 162 adapted to be screwed into contact by its other end with the plunger 147 for the purpose of applying a follow-up pressure directly to the plunger 147 and through the pressure frame and spring 156 to the plunger 146.

In the case of a splice between cable ends requiring a non-vulcanizable sealing compound, the splice may be placed centrally in the mold as shown in Fig. 15. However, in the case of a splice containing a vulcanizable compound, the splice should preferably be shifted relative to the passages 137 so that these passages will not be locked by the cured compound. Thus, in the case of the splice shown in Fig. 3, the splice should be shifted to the left in the mold shown in Fig. 15 sufficient to bring the non-vulcanizable zone C opposite the passages 137.

After the molding structure has been assembled with the cable splice in position, connection is made from the channels or tubes 131 and 132 to a supply of cooling water, and the tubes 133 may be interconnected in series relation or in any other desired manner and connected to a system for supplying circulating steam therethrough. With the ends of the mold 120 kept at low temperature, the cable insulations at these points are prevented from becoming plastic and thus will retain their shape and dimensions. The sealing strips 105 and the conical ends 104 of the cable insulations being subjected to the heat of the circulating steam will become plastic and more or less fluid. The sealing strips 105 will consequently flow into a physically homogeneous mass which will adhere closely to the conducting strand and will partially mix with the cable insulations along the cone surfaces 104.

During the heating period the rod 161 is screwed into the end-piece 152, thereby exerting a pressure on both cartridges of supplemental compound 145 in the directions toward the cable splice. The cartridges 145 also being subjected to the heat will turn into a plastic or semifluid state and, as the pressure from rod 161 is increased, supplemental compound will be supplied through the passages 137 to the sealing compound of the splice. The pressure is increased to such a value that all voids within the mold will be filled, the air from such voids being forced out through the ends of the mold 120.

For the purpose of vulcanizing a vulcanizable sealing compound, the heating stage will usually be maintained for about thirty minutes with a temperature of approximately 142° C.

After the seal has been formed or cured, the steam is shut off from the tubes 133 and the mold is permitted to cool progressively from the end portions toward the center portion, where the supplemental compound is supplied. During this cooling stage the rod 161 must be continually tightened up to supply supplemental compound to the gradually shrinking sealing compound of the splice. The pressure must be high enough to prevent formation of blow-holes due to generation of steam, and to fill all shrinkage bubbles; it will be found that for this purpose the necessary pressure on the supplemental compound, and therefore on the sealing compound, may be as high as 10,000 pounds per square inch. The pressure must, however, not be sufficient to cause a continuous escape of compound between the two mold-halves, in order to avoid formation of flow surfaces separated by voids within the compound due to flow about the central conductor.

After the cooling has progressed to the point where the entire sealing compound and the supplemental compound have returned to a substantially solid state, the pressure may be relieved by unscrewing the rod 161; the molding structure is dismantled and the cable splice removed from the mold. The excess supplemental compound attached to the middle of the splice is removed and any irregularities in the surface of the splice are removed. The splice is then ready for application of the armoring.

It has been found that by this method of sealing the splice, the sealing compound is vulcanized closely to the conical surfaces of the cable cores and is so thoroughly united with the cable insulations along these surfaces as to practically form a physically continuous layer of insulation about the central conductor, so that sea water is effectively prevented from entering the seal.

The process of making a cable splice, as just described, may be modified in several minor details without a departure from the scope of the invention. Thus, the end of the mold 120 enclosing the cable end which is insulated with vulcanizable compound may, if desired, be heated by application of steam to the passages 131 during at least a part of the heating and cooling periods, with the object of promoting the vulcanizing action at the surface of the insulation on the cable end. It may also be found advantageous, in building up the sealing compound between the conical surfaces 104, to use tape of vulcanizable compound for all the layers. The same general process and the same molding structure may also be used in the splicing of the cable ends having similar insulating compounds, as in the case of two cable sections both insulated with paragutta or both insulated with a vulcanizable rubber compound.

In all cases, however, it is advantageous that the space between the conical surfaces be built up originally with as small and few voids as possible; that the splice be molded in a closed mold sufficiently tight-fitting to permit the setting up of a very high follow-up pressure on the sealing compound; that a pressure be maintained particularly during the cooling period sufficiently high to prevent formation of shrinkage bubbles due to generation of steam, and to fill all voids originally present or arising due to shrinkage; and that the cooling of the splice should proceed, practically speaking, from points remote from the part of the seal at which the supplemental compound is applied and progress gradually toward that portion in order that supplemental material may be supplied longitudinally of the seal toward the cooled portions thereof.

Whereas preferred and alternative embodiments of the invention have been illustrated and described, various other modifications may be made therein without a departure from the scope of the invention as defined by the appended claims.

This application is in part a continuation of my application Serial No. 71,411, filed on March 28, 1936, which has issued as Patent No. 2,158,492 on May 16, 1939.

What is claimed is:

1. In a method of molding a seal about an intermediate portion only of an elongated strand, the steps of placing in a mold the said portion of the strand and a predetermined quantity of a cold sealing compound surrounding said portion, of tightly confining said compound between contiguous surfaces of said mold, of heating the mold and contents to plasticize said compound, of applying a high pressure to said compound as confined within the closed mold to compress it and force it into close contact with the said strand, of cooling the mold and contents, and of preventing substantial relaxation of said pressure until the compound has cooled substantially to the solid state.

2. In a method of molding a seal about an intermediate portion only of an elongated strand, the steps of placing in a mold the said portion of the strand and a predetermined quantity of a cold sealing compound surrounding said portion, of heating the mold and contents to plasticize said compound, of tightly closing the mold during said heating step to discharge excess compound therefrom, of cooling the mold and contents, and of applying an increasing pressure to said compound within the closed mold during the entire cooling of said compound to the solid state.

3. In a method of molding a seal about an intermediate portion only of an elongated strand, the steps of placing in a mold the said portion of the strand and a predetermined quantity of a cold sealing compound surrounding said portion, of heating the mold and contents to plasticize said compound, of tightly closing the mold during said heating step to discharge excess compound therefrom, of thereafter applying a high pressure to said compound within the closed mold, of cooling the mold and contents to solidify said compound, and of maintaining the said pressure on said compound substantially independently of shrinking of said compound during said cooling.

4. A method of hot molding a seal about an intermediate portion of an elongated conducting strand which comprises placing the portion of the elongated strand and a predetermined quantity of a solid sealing compound surrounding said portion in a split mold, guiding the strand on both sides of said portion to center the strand in the seal, lightly closing the mold, plasticizing the compound by heating the mold, the compound and the portion of the strand, applying pressure to the mold to compress the compound about the strand till the mold is tightly closed, cooling the mold, the compound and the strand, applying pressure to the compound in a direction parallel to the strand and maintaining the pressure during cooling to follow up the shrinking compound and thereby prevent formation of blow-holes in the compound.

5. In a method of sealing a vulcanizable compound to a brass surface, the steps of smoothening by burnishing of said surface, of immediately thereafter applying a vulcanizable compound to cover said surface and of molding, vulcanizing and cooling substantially to the solid state the compound within a tightly closed mold under a continued high pressure between the compound and the surface.

6. In a method of securing a bond of great mechanical strength between a brass surface and a vulcanizable compound, the step of smoothing said brass surface by passing a smooth polished body of steel over said brass surface with a contact pressure sufficient to produce a flow in said brass surface, the subsequent step of placing said vulcanizable compound in intimate contact with the uncontaminated smoothened brass surface, the subsequent step of vulcanizing said compound to said smoothened brass surface under high pressure during the heating and cooling periods thereof.

7. A method of producing an insulating seal of great mechanical strength between two opposed brass surfaces which comprises smoothing each of said brass surfaces by passing a smooth polished body of steel over the surface with a contact pressure sufficient to rub out irregularities therein, placing a vulcanizable compound in intimate contact with one of said smoothened surfaces, placing the other smoothened surface in juxtaposition to the first of said surfaces, compressing said compound between said juxtaposed surfaces by pressure applied in directions parallel to said surfaces to force said compound into intimate contact with both of said surfaces, and vulcanizing said compound on to both of said surfaces.

8. A method of producing an insulating gland of great mechanical strength between the two opposed concentric surfaces of an inner elongated brass conductor and of an outer cylindrical brass conductor which comprises the step of passing the outer surface of said inner conductor in frictional contact with a rounded steel body under pressure sufficient to smoothen said outer surface, placing in a split mold said elongated inner conductor with a quantity of vulcanizable compound about an intermediate portion thereof, heating mold and contents below vulcanizing temperature, applying pressure to the mold to compress the compound and press it into intimate contact with said smoothened surface, cooling mold and contents, applying pressure to the compound in the axial direction of the conductor and maintaining the axial pressure during cooling to exclude gas from the mold and to prevent formation of gas therein, removing conductor and molded compound as a unit from mold, forcing a rounded steel body into frictional contact with the inner surface of said outer conductor under pressure sufficient to smoothen said inner surface, inserting said removed unit into said outer conductor with a portion of said molded compound juxtaposed to a portion of said inner surface and in approximate engagement therewith to form an assemblage, placing the assemblage in the close-fitting enclosure of a second mold, heating the second mold and contents at least to the vulcanizing temperature of said compound, applying axially directed pressure to said compound during the heating in said second mold to press said compound into intimate contact with said inner and outer surfaces for vulcanization of said compound to said surfaces, cooling the second mold and contents, and maintaining said axially directed pressure during cooling of the second mold and contents to exclude gas therefrom and to prevent formation of gas therein.

9. A method of manufacturing a composite seal for an elongated conductor which comprises molding in a closed mold, substantially without vulcanization, a vulcanizable compound forming a section of the seal and a non-vulcanizable compound forming a contiguous section of the seal about an intermediate portion of the conductor under application of pressure to secure intimate contact between said sections of compounds and between said sections and said portion, and subsequently curing the vulcanizable compound whereby it is sealed to the conductor and to the non-vulcanizable compound, said pressure being supplied substantially in the direction of the length of the conductor.

10. A method of sealing a section of a vulcanizable insulating compound and an adjacent section of a non-vulcanizable insulating compound to a middle portion of an elongated conducting strand and to each other which comprises molding, substantially without vulcanizing, the vulcanizable compound in contact with a part of said middle portion and the non-vulcanizable compound in contact with an adjacent part of said middle portion and in contact with the vulcanizable compound under application of heat and pressure in a mold, cooling the compounds in the mold and simultaneously therewith applying a pressure to the compounds in a direction parallel to the strand to prevent formation of blow-holes at the engaging surfaces between the compounds and between the strand and the compounds, and subsequently curing the vulcanizable compound to secure continuous adherence of said cured compound with the non-vulcanizable compound and with the conducting strand.

11. A method of producing an insulating seal for the joint between two compound-insulated conductors, which comprises the steps of tightly wrapping a tape of insulating sealing compound about the joined conductors to fill the space between the prepared ends of the conductor insulations, placing the seal in a substantially tight-fitting mold, heating and cooling the mold to plasticize and mold the sealing compound, and supplying under pressure during the said heating and cooling steps additional sealing compound in plasticized form to an intermediate portion of the seal within the mold to prevent formation of voids within the mold.

12. A method of producing a sealing joint between two separated bodies of insulation about a conducting strand which comprises the steps of filling the space about the strand between the prepared ends of said bodies with a quantity of insulating sealing compound, of placing the seal in a substantially tight-fitting mold, of heating and cooling the mold to plasticize and mold the sealing compound, and of supplying under high pressure during said heating and cooling steps additional sealing compound in plasticized form to an intermediate portion of the seal within the mold to prevent formation of voids within the mold.

13. A method of producing an insulating seal for joining two separated portions of cable insulation in a submarine cable, which comprises shaping the ends of the cable insulation to present a substantially conical surface toward the joint, tightly wrapping a tape of insulating compound in successive layers about the conductor core of said cable to entirely fill the space between said conical surfaces, clamping tightly a split-mold about the seal and the adjacent insulation portions, heating the portion of the mold containing the said seal for plasticizing the said compound, cooling during the said heating step one end of the mold to maintain the cable insulation within that end in a solid state, discontinuing said heating and cooling the entire mold and contents until the seal has set, and forcing during the said heating step and the subsequent cooling step additional insulating compound in plasticized form into the heated portion of said mold to maintain the seal under high pressure until it has set.

14. A method of producing an insulating seal of great mechanical strength between two opposed concentric, cylindrical, brass surfaces, which comprises smoothing each of said brass surfaces by passing a smooth polished body of steel over the surface with a contact pressure sufficient to rub out irregularities therein, molding a vulcanizable compound in intimate contact with the inner one of said smoothened surfaces, placing the outer smoothened surface in juxtaposition to the inner of said surfaces, compressing said compound between said juxtaposed surfaces by pressure applied in a direction parallel to the common axis of said surfaces to force said compound into intimate contact with both of said surfaces and vulcanizing said compound on to both of said surfaces during said compression step.

15. A method of producing an insulating seal of great mechanical strength between two opposed concentric, cylindrical, brass surfaces, which comprises smoothing each of said brass surfaces by passing a smooth polished body of steel over the surface with a contact pressure sufficient to rub out irregularities therein, placing a cold vulcanizable compound about the inner one of said smoothened surfaces and molding the compound under pressure into intimate contact with said inner surface to form a substantially uniform layer of said compound about said inner surface, placing the outer smoothened surface about said molded compound in a mold, heating the mold and its contents and compressing within the mold said compound between the opposed surfaces by pressure applied in a direction parallel to the common axis of said surfaces to force said compound into intimate contact with both of said surfaces and to vulcanize said compound on to both of said surfaces.

16. A method of producing an insulating seal of great mechanical strength between two opposed concentric, cylindrical, brass surfaces, which comprises smoothing each of said brass surfaces by passing a smooth polished body of steel over the surface with a contact pressure sufficient to rub out irregularities therein, placing a cold vulcanizable compound about the inner one of said smoothened surfaces in a mold and molding the compound under pressure into intimate contact with said inner surface and at temperatures below the vulcanizing temperature of said compound to form a substantially uniform layer of said compound about said inner surface, placing the outer smoothened surface about said molded compound in a mold, heating the last said mold and its contents and compressing within the mold said compound between the opposed surfaces by pressure applied in a direction parallel to the common axis of said surfaces to force said compound into intimate contact with both of said surfaces and to vulcanize said compound on to both of said surfaces.

WALTER M. BISHOP.